April 20, 1965  J. DANKOFF ETAL  3,179,303

METERING AND DISPENSING DEVICE

Filed April 20, 1961

JOSEPH DANKOFF
ROBERT G. GREENE
INVENTORS.

BY Albert M Herzig

ATTORNEY

United States Patent Office 3,179,303
Patented Apr. 20, 1965

3,179,303
METERING AND DISPENSING DEVICE
Joseph Dankoff, 614 E. Groves Ave., and Robert G. Greene, 536 S. Orange St., both of Monterey Park, Calif.
Filed Apr. 20, 1961, Ser. No. 104,301
3 Claims. (Cl. 222—243)

This invention relates to a novel, improved and simplified metering and dispensing device for materials such as finely divided solid materials, for example, coffee. The invention will be described herein by way of example as a device for metering and dispensing coffee although its utilization is expressly not limited thereto.

The primary object of the invention is to fulfill a need for this type of device for metering and dispensing materials which meets the requirements of accuracy and effectiveness, simplicity of construction and operation, economy and that it adapts itself readily to being disassembled for cleaning purposes and reassembly. The herein invention meets all of these requirements and others. It may be made of easily fabricated and relatively inexpensive materials such as plastics.

The invention is a simplified unitary device which may be attached to any type of container in which materials are merchandised such as, for example, a coffee jar or container having a threaded neck adapted to receive a threaded cap or cover. The metering and dispensing device of the invention may be attached to such a container and then used for metering and dispensing as will be described in detail hereinafter. One of the objectives of the invention is to achieve and realize such adaptability in the device.

Another object of the invention is to provide a dispensing device capable of dispensing accurately measured amounts of material and further, having adjustment means for adjusting or metering the amounts or charges of material that are dispensed.

A further object of the invention is to accomplish the foregoing in a simplified device having a minimum of parts which are readily manually assembled without tools and similarly, may be manually disassembled for purposes of cleaning.

Further objects and advantages of the invention will become apparent from the following detailed description, claims and annexed drawings wherein:

Referring now more in detail to the various figures of the drawings, numeral 10 designates an exemplary form of the metering and dispensing device of the invention attached to a container as designated at 11. Such container might be a glass coffee jar or bottle having a screw threaded neck as designated at 13 in FIG. 3. In the form of the invention shown, the device of the invention is circular having a slight upward and outward taper. The upper tapered part 14 is internally threaded as shown to receive the threaded neck 13 of the jar or bottle 11.

Figure 1:
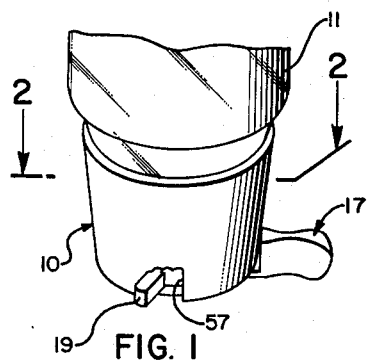
FIG. 1 is a perspective view of a preferred form of the invention associated with a jar or container.

With the dispenser in position as shown in FIG. 1, a metered charge of material such as coffee may be dispensed by manipulation of the handle 17 as will be described in detail hereinafter. The amount or size of the individual charge may be accurately metered or adjusted by means of a metering adjustment 19.

Figure 4:
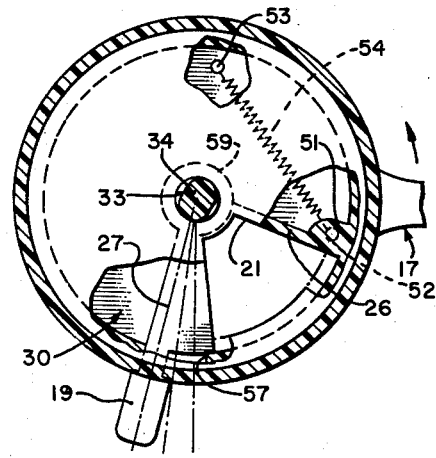
FIG. 4 is a sectional view taken along the line 4—4 of FIG. 3.

The device has an intermediate partition as designated at 20 which has an opening in it of arcuate or sector shape as designated at 21 in FIG. 4. Extending downwardly from the partition 20 is an integral central bushing 23. The lower part of the device is hollow, there being however, a sector shaped pocket in the annular space around the bushing 23. This pocket is designated at 25 in FIG. 5. This pocket is formed on one side by a radial partition 26 and on the other side by a radially extending wedge shaped part 27 of the metering adjustment lever 19. These parts will be referred to again more in detail presently.

The bottom of the device is in the form of a rotatable disk 30 which is rotatable by the manual operating lever 17. It, too, has a sector shaped opening in it as designated at 32 in FIG. 5 and which will be referred to again presently.

The disk 30 is secured to a cylindrical stem 33 having an extending part 34 of smaller diameter. The part 33 is journalled in the bushing 23. The part 34 extends through and is keyed to another disk designated at 37. The disk 37 rests on and is adjacent to the partition 20. It also has a sector shaped opening in it as designated at 39 and adjacent one radial edge of this sector shaped opening is an upright pusher member 40a. The lower part of dispensing and metering device has a square shoulder at 31 which serves as a limit stop for handle 17 which stops opening 39 directly over opening 21.

Figure 2:
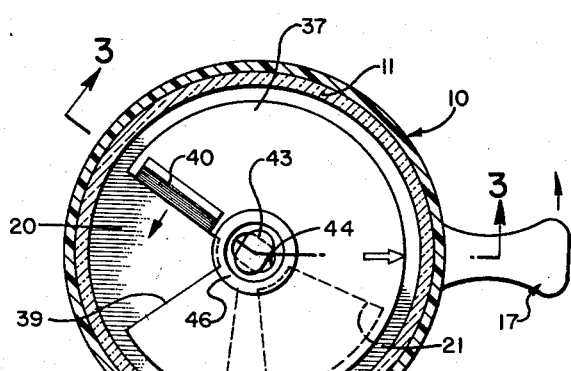
FIG. 2 is a sectional view taken along the line 2—2 of FIG. 1.

The stem part 34 has a restricted neck portion 42 and a head 43 having an elongated shape as shown in FIG. 2. Its shape corresponds to the shape of an opening 44 in a partition in a cylindrical holding cap or bushing member 46. This holding bushing is open at both ends as shown and interposed between the partition in it and the disk 37 is a coil spring 40 which normally urges the disk 37 downwardly and holds the parts in assembled relationship. Merely by rotating the stem 34 so that the head 43 aligns with the opening 44 the holding cap or bushing 46 can be removed and the parts disassembled for cleaning as will be described more in detail presently. The force of spring 40 holds disk 30 firmly seated against the shoulder at the bottom of dispensing and metering device to maintain a sealed relationship.

Referring again to FIGS. 4 and 5, adjacent the partition member 26 at the outer part thereof, is a boss 51 which has a vertical bore and received in the bore is a pin 52. Numeral 54 designates a coil spring which is attached to the lower end of the pin 52 which is a position adjacent the lower part of the housing of the device 10 and close to the disk 30. The other end of the coil spring 54 is attached to a pin 53 on the disk 30. When the disk 30 is rotated in a counter-clockwise direction by handle 17 as viewed in FIGS. 4 and 5 the spring 54 is stretched. When the handle is released, the disk 30 is rotated back in a clockwise direction by the spring as will be described more in detail presently.

Figure 5:
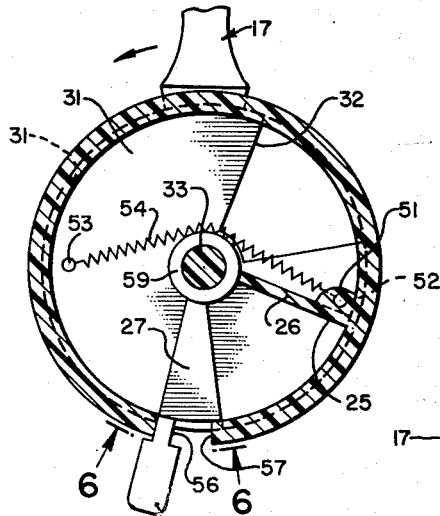
FIG. 5 is a sectional view taken along the line 5—5 of FIG. 3.
Figure 6:
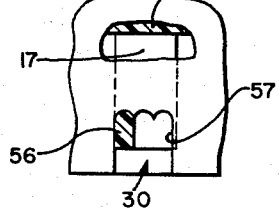
FIG. 6 is a detailed sectional view taken along the line 6—6 of FIG. 5.

The metering adjusting lever 19 has a narrow neck part 56 which extends out through an opening 57 in the lower part of the side of the device 10. The lever 19 is just over the disk 30 as is its radial wedge shaped part 27 previously described. The inner end of the metering lever 19 is journalled on the stem part 33 as designated at 59. The upper part of the opening 57 is configurated to provide rounded depressions to provide three set positions for the neck part 56 of the metering lever 19 which part has a rounded upper surface as may be seen in FIG. 6. Each of these positions provide for an accurately metered charge of material of a different amount to be dispensed. FIGS. 4 and 5 illustrate how the metering lever 19 and its part 27 adjust the size of the pocket 25 in the lower part of the device from which the material is dispensed.

With reference to the operation of the device, as previously pointed out, FIG. 1 shows it in position threaded onto a coffee container or jar or the like. The metering lever 19 is in position for metering and dispensing charges of material of a predetermined amount.

Figure 3:
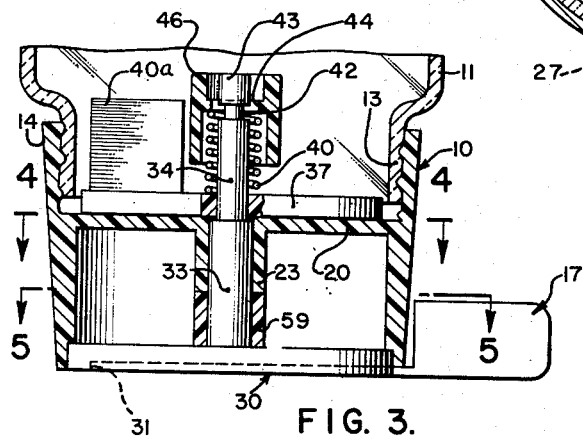
FIG. 3 is a sectional view taken along the line 3—3 of FIG. 2.

In operating the device, the whole assembly may be held in one hand in substantially the position shown in FIGS. 1 and 3. The operating handle 17 is rotated in a counter-clockwise direction and is viewed in FIG. 4. This rotates the disk 30 and also the disk 37, the spring 54 being stretched as shown in FIG. 5. This moves the sector shaped opening 32 in the disk 30 away from, that is, out from underneath the sector shaped pocket, that is, the metering pocket 25 in the lower part of the device 10. This movement rotates the sector shaped opening 39 in the disk 37 to a position over the sector shaped opening 21 in the partition 20. The pusher 40a pushes the material along over the partition 20 and pushes it into the opening 21. Thus, there can be no bridging or jamming of the material such as would prevent proper metering and/or dispensing. The material passes through the opening 21 in partition 20 and it passes into the metering pocket 25 where it is accurately metered, that is, measured. That is, the metering pocket 25 is filled and it accurately measures an amount of material proportionate to its size. The size of the pocket is determined by the radial edge of the wedge shaped part 27 of the metering handle 19. As previously described, this handle has three positions for predetermining the sizes of three particular metered charges. The pusher 40 moves over the opening 21 so it and the disk 37 flatten off the top of the material in the metering pocket.

The handle 17 is then simply released and it and the disks return to the position of FIG. 3. When this happens, the sector shaped opening 32 in the disk 30 moves to a position underneath the metering pocket 25 and the accurately metered charge in this pocket drops out and into a cup or whatever other container is held under the metering and dispensing device. In this manner, anyone without any particular skill, may very easily, conveniently and effectively use the device to meter and dispense quantities of material.

From the foregoing, those skilled in the art will readily observe that the invention achieves and realizes the objectives stated in the foregoing and has all of the advantages outlined in addition to many others. Only the simplest kind of a movement is necessary to operate the device to dispense while at the same time metering the charge. The device is extremely simple and effective. It may be fabricated very economically and requires a minimum of parts, although, as pointed out, it is readily adaptable to manual assembly and disassembly. The device fulfills a long felt need in the way of a convenience for dispensing metered quantities of material, such as for example, coffee in an economical and, nevertheless, very sanitary way.

The foregoing disclosure is representative of a preferred form of the invention and is to be interpreted in an illustrative rather than a limiting sense, the invention to be accorded the full scope of the claims appended hereto.

What is claimed is:

1. A dispensing and metering device comprising a circular sleeve having a transverse partition in it, said partition having a sector shaped opening in it, shutter means for covering and uncovering said opening in said partition, comprising a rotatable disk over said partition, said disk having a sector shaped opening in it, fixed means forming a sector shaped metering pocket directly beneath the opening in said partition, said metering pocket having one angularly adjustable side wall to vary the size of the metering pocket, shutter means for releasing material from the metering pocket comprising a rotatable disk directly underneath the said pocket, said last mentioned disk having a sector shaped opening in it movable to a position directly underneath the metering pocket, and means for operating said disks to first discharge a metered quantity of material from the container into the said metering pocket and then to discharge a metered quantity of material from the metering pocket, said disks being mounted on a central stem and handle means for rotating the said stem, the sector shaped openings in the said disks being angularly displaced, whereby upon rotation of the handle in one direction, the material is discharged into the metering pocket and upon rotation of the handle in the opposite direction, the metered quantity of material is discharged from the metering pocket, said stem including an elongated head, having a shoulder journalled in said sleeve and means whereby said shutter means over said partition may be removed, including a holding cap having an elongated opening provided therein, said elongated opening corresponding in shape to said elongated head, whereby said cap may be placed on said stem and rotated until said cap engages said shoulder and a compression spring encompassing said stem, said spring biasing said cap against said shoulder and biasing said first-mentioned disk against said partition.

2. The device of claim 1 including a spring for angularly biasing said handle in one direction.

3. The device of claim 1 including an upright member adjacent to the trailing edge of the sector shaped opening in said first mentioned disk for pushing material ahead of it in said container and into the opening in said partition.

References Cited by the Examiner
UNITED STATES PATENTS

| | | | |
|---|---|---|---|
| 928,052 | 7/09 | Hirsch | 222—452 |
| 1,401,412 | 12/21 | Klein | 222—449 |
| 1,617,922 | 2/27 | Morrison | 222—452 |
| 1,684,313 | 9/28 | Graham | 222—452 X |
| 2,110,762 | 3/38 | Engrao | 222—449 |
| 2,250,968 | 7/41 | Riendeau | 222—452 X |
| 2,446,582 | 8/48 | Gopner | 222—362 X |

RAPHAEL M. LUPO, *Primary Examiner.*

LOUIS J. DEMBO, *Examiner.*